United States Patent [19]

Reintges et al.

[11] Patent Number: 4,828,318
[45] Date of Patent: May 9, 1989

[54] DRIP MOLDING FOR THE SLIDING/LIFT-UP ROOF OF A MOTOR VEHICLE

[75] Inventors: Rolf Reintges, Russelsheim; Richard Stahlhut, Offenbach, both of Fed. Rep. of Germany

[73] Assignee: General Motors Corporation, Detroit, Mich.

[21] Appl. No.: 156,489

[22] Filed: Feb. 16, 1988

[30] Foreign Application Priority Data

Mar. 4, 1987 [DE] Fed. Rep. of Germany ....... 3706917

[51] Int. Cl.⁴ .............................................. B60J 7/05
[52] U.S. Cl. .................................... 296/213; 296/221
[58] Field of Search ...................... 296/213, 221, 222

[56] References Cited

U.S. PATENT DOCUMENTS

| 4,664,439 | 5/1987 | Schaetzler et al. | 296/213 |
| 4,671,565 | 6/1987 | Grimm et al. | 296/213 X |
| 4,725,092 | 2/1988 | Reintges et al. | 296/221 |

FOREIGN PATENT DOCUMENTS

| 3444606 | 7/1985 | Fed. Rep. of Germany | 296/221 |
| 2133460 | 7/1984 | United Kingdom | 296/221 |

*Primary Examiner*—Dennis H. Pedder
*Attorney, Agent, or Firm*—Charles E. Leahy

[57] ABSTRACT

A drip molding for a vehicle sunroof of the type which lifts up to ventilate the vehicle body catches water at the rear end of the roof closure panel. The drip molding is mounted on a pivot lever which is pivotally connected to a slotted guide link of the roof closure and to a shoe sliding along a body mounted track. The pivot lever is raised and lowered angularly during the lifting and lowering of the roof closure so that the drip molding is lifted and lowered to remain consistently in water catching proximity with the rear edge of the closure panel.

1 Claim, 2 Drawing Sheets

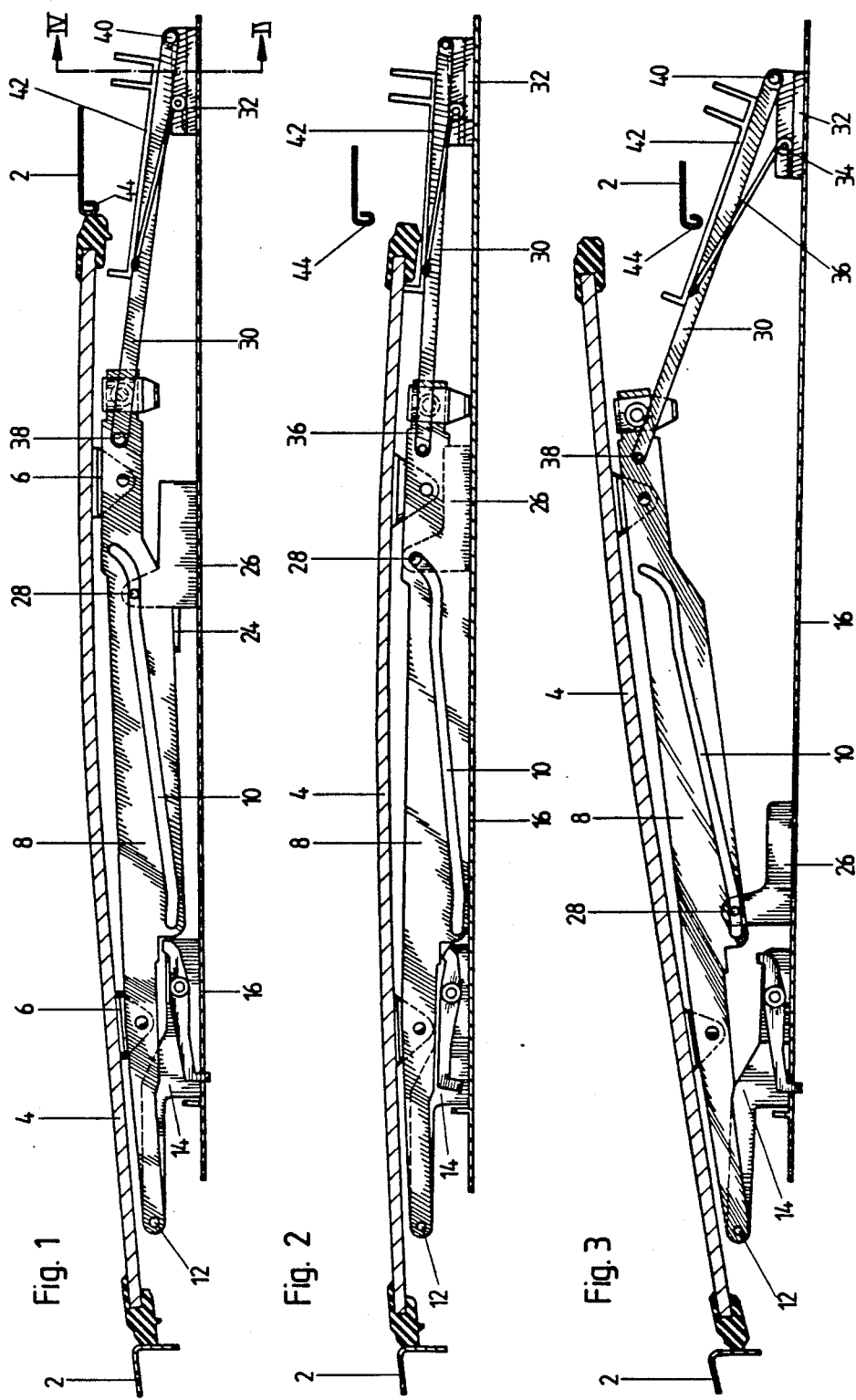

DRIP MOLDING FOR THE SLIDING/LIFT-UP ROOF OF A MOTOR VEHICLE

The present invention pertains to a drip molding for the sliding./lift-up roof of a motor vehicle, which is disposed on a sliding piece connected to the slotted link guide carrying the cover of the sliding/lift-up roof.

BACKGROUND OF THE INVENTION

A sliding/lift-up roof for motor vehicles, whose rigid cover is connected on each side to a front and rear sliding block mounted in a sliding manner on guide rails via a slotted link guide, is disclosed in U.S. Pat. No. 4,725,092 issued Feb. 16, 1988 in the name of Reintges et al. The rear sliding block is driven by a cable and has a pin which reaches into a slot of the slotted link guide. The front sliding block serves as a pivoting support for the cover. The slotted link guide is in connection with another sliding piece via a leg spring and is secured against displacement by a hook reaching into an opening of the guide rail under the effect of a spring. During its downward movement—near the end of the said movement—the slotted link guide provided with a guide slot acts on the hook to release it, and a holding-down device which reaches into the guide rail during the downward movement is provided on the slotted link guide. The sliding piece carrying the leg spring carries a drip molding for collecting and channeling off the water penetrating into the slot between the rear edge of the cover and the edge of the roof of the vehicle. Since the drip molding is rigidly attached to the sliding piece, the distance in height between the molding and the roof edge is always the same if the cover of the sliding/lift-up roof is displaced or tilted up. Therefore, splashing water may enter the interior of the vehicle during braking if the cover is open in the ventilation position.

Therefore, the task of the present invention is to dispose the drip molding so that no water is able to enter into the vehicle even if the cover of the sliding/lift-up roof is in the ventilation position. This is achieved according to the present invention in an advantageous manner by mounting the drip molding pivotably on the slotted link guide and on the sliding piece.

Due to the pivotable mounting of the drip molding according to the present invention, the distance between the said drip molding and the roof edge is very small with the cover folded up, so that good sealing against water is guaranteed.

An advantageous further improvement of the present invention is the fact that the said drip molding is mounted on a pivot lever mounted on the said slotted link guide and on the said sliding piece. To make it possible to lift up the cover into the ventilation position, the pivot lever can be spring-load. Therefore, a leg spring, one leg of which is connected to the pivot lever, is provided on the sliding piece.

BRIEF DESCRIPTION OF THE DRAWINGS

Further characteristics and advantages of the present invention can be found in the drawing and in the corresponding description of the drawing. The drawing shows an example according to the present invention.

FIG. 1 shows a longitudinal section through the sliding/lift-up roof with the lateral shifting mechanism in the closed position of the cover.

FIG. 2 shows the section corresponding to FIG. 1, but with the cover lowered in the rear to permit its displacement.

FIG. 3 shows the section corresponding to FIGS. 1 and 2 with the cover folded up in the rear in the ventilation position.

DESCRIPTION OF THE PREFERRED EMBODIMENT

Figure 4:
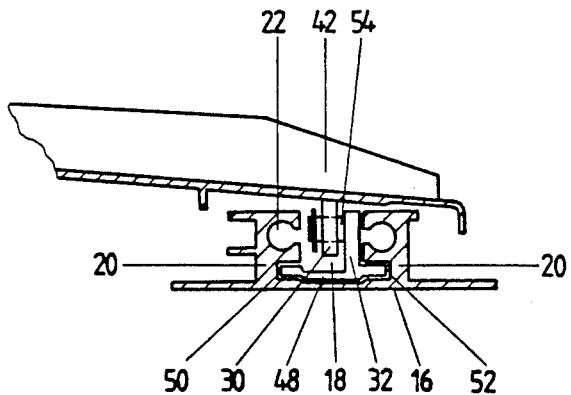
FIG. 4 shows a section along the line IV—IV in FIG. 1.

The cover 4 located in a cutout of the vehicle roof 2 is firmly attached by means of the holding brackets 6 to a slotted link guide 8 which has a guide slot 10. The individual parts of the sliding/lift-up roof are shown in a more schematic form to better recognize the mode of action of the present invention. The slotted link guide 8 is pivotably mounted at its front end at 12 on a front sliding block 14. the sliding block 14 is guided on a guide rail 16, of which only the lower part is shown in FIG. 1, but its entire cross-section is shown in FIG. 4, and it is located in a space 18 which is formed by the sections 20 of the guide rail 16. Canals 22 in the parts 20 serve to receive a drive cable 24 which is indicated in FIG. 1 and is in connection with a rear sliding block 26 which is moved by the cable 24.

The rear sliding block 26 has a pin 28 with which it reaches into the guide slot 10. Via a pivot lever 30, the slotted link guide 8 is connected to another sliding piece 32 which is provided with a pivoting spring 34, one leg 36 of which is supported by the pivot lever 30. The pivot lever 30 is pivotably attached at 38 and 40 to the slotted link guide 8 and to the sliding piece 32. A drip molding 42, which follows the pivoting movement of the lever 30 and is very close to the edge 44 of the vehicle roof 2 in the ventilation position of the cover 4 according to FIG. 3, and thus provides for good separation of water, is disposed on the pivot lever 30.

To permit the different positions of the pivot lever 30 according to FIGS. 1 and 3, the sliding piece 32 is arranged in a sliding manner in the slotted link guide 16, and it reaches with its T-shaped extension 48 into matching openings 50 and 52 in the rail 16. A pin 54 (FIG. 4) by which the lever 30 is supported, is provided on the sliding piece 32.

The present invention was explained above in greater detail based on the example illustrated in the drawing. Of course, the present invention is not limited to this example, since there are many different modifications of the design of the drip molding, and its arrangement on the sliding/lift-up roof are possible without going beyond the scope of the present invention.

We claim:

1. A drip molding for catching water entering at the rearward edge of a roof closure of the type upwardly movable above the roof to a ventilating position, and downwardly movable below the roof for fore and aft movement along a track between open and closed positions, comprising:

a slotted guide link carried by the roof closure, drive means acting between the track and the slotted guide link to selectively move the roof closure upwardly and downwardly and fore and aft, a rear shoe slidable along the track rearwardly of the slotted guide link, a pivot lever having one end pivotally mounted on the slotted guide link and another end pivotally mounted on the rear shoe by a stationary pivot so that the fore and aft roof closure by the drive means causes the pivot lever to move the rear shoe along the track, said pivot lever being angularly movable upon upward and downward movement of the roof closure, and a drip tray mounted on the pivot lever and angularly movable therewith to be consistently positioned beneath a rearward edge of the roof closure upon the upward and downward movement of the roof closure to catch water entering the vehicle body.

* * * * *